United States Patent
Lee et al.

(10) Patent No.: US 9,066,371 B2
(45) Date of Patent: Jun. 23, 2015

(54) METHOD AND APPARATUS OF TRANSMITTING A WHITE SPACE MAP INFORMATION IN A WIRELESS LOCAL AREA NETWORK SYSTEM

(75) Inventors: Jihyun Lee, Gyeonggi-do (KR); Eunsun Kim, Gyeonggi-do (KR); Yongho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 13/825,845

(22) PCT Filed: Feb. 9, 2011

(86) PCT No.: PCT/KR2011/000840
§ 371 (c)(1),
(2), (4) Date: Mar. 25, 2013

(87) PCT Pub. No.: WO2012/043943
PCT Pub. Date: Apr. 5, 2012

(65) Prior Publication Data
US 2013/0177007 A1    Jul. 11, 2013

Related U.S. Application Data

(60) Provisional application No. 61/386,972, filed on Sep. 27, 2010.

(51) Int. Cl.
*H04W 84/12* (2009.01)
*H04W 16/14* (2009.01)

(52) U.S. Cl.
CPC .............. *H04W 84/12* (2013.01); *H04W 16/14* (2013.01)

(58) Field of Classification Search
CPC .............................. H04W 84/12; H04W 16/14
USPC .......................................................... 370/338
See application file for complete search history.

(56) References Cited

U.S. PATENT DOCUMENTS 8,599,773 B2 * 12/2013 Hsu et al. ...................... 370/329
2007/0047492 A1    3/2007 Kim et al.
(Continued)

FOREIGN PATENT DOCUMENTS

CA        2734902 A1    2/2010
WO    2011096746 A2    8/2011

OTHER PUBLICATIONS

Written Opinion issued in corresponding International Patent Application No. PCT/KR2011/00840 dated Oct. 24, 2011.
(Continued)

*Primary Examiner* — Brian D Nguyen
(74) *Attorney, Agent, or Firm* — Morgan, Lewis & Bockius LLP (57) ABSTRACT

A method of transmitting a White Space Map information in a wireless local area network system (WLAN) is disclosed. A method of transmitting a white space map information from a first station to a second station in a regulatory domain where a licensed device and an unlicensed device are permitted to operate together in a wireless local area network (WLAN) comprises transmitting, from the first station, one of a beacon frame, a probe response frame and a white space map announcement frame comprising a white space map (WSM) element comprising information for first available channels, which are available for the unlicensed device, to the second station, wherein the WSM element comprises a device type field indicating which device type the list of the fist available channels is for.

20 Claims, 10 Drawing Sheets

(56) References Cited

U.S. PATENT DOCUMENTS

| | | | |
|---|---|---|---|
| 2008/0298333 | A1 | 12/2008 | Seok |
| 2010/0046440 | A1 | 2/2010 | Singh |
| 2010/0048234 | A1 | 2/2010 | Singh |
| 2011/0116458 | A1* | 5/2011 | Hsu et al. .................. 370/329 |
| 2011/0188486 | A1 | 8/2011 | Kim et al. |
| 2011/0194503 | A1* | 8/2011 | Stanforth .................. 370/329 |
| 2011/0310815 | A1 | 12/2011 | Kim et al. |
| 2012/0008604 | A1* | 1/2012 | Kasslin et al. ............. 370/338 |
| 2012/0032854 | A1* | 2/2012 | Bull et al. .................. 342/450 |
| 2012/0033621 | A1* | 2/2012 | Mueck ...................... 370/329 |
| 2012/0054143 | A1* | 3/2012 | Doig et al. ................. 706/47 |
| 2012/0256789 | A1* | 10/2012 | Bull et al. ................. 342/357.25 |

OTHER PUBLICATIONS

Notice of Allowance issued in counterpart Korean Patent Application No. 10-2013-7010565 dated Apr. 29, 2014.

International Search Report issued in corresponding International Patent Application No. PCT/KR2011/00840 dated Oct. 24, 2011.

Office Action dated Nov. 21, 2014, issued by the Canadian Intellectual Property Office in Canadian Patent Application No. 2,811,890.

Office Action dated Mar. 25, 2015, issued by the GB Intellectual Property Office in GB Patent Application No. GB1305206.3.

\* cited by examiner

| Element ID | Length | Country code | Channel Map |
|---|---|---|---|
| 1 | 1 | 3 | N |

Octets :

Fig. 6

| Device Type | Channel Number N | Max. Transmission Power level on Channel N | Channel Number M | Max. Transmission Power level on Channel M | ..... | Channel Number K | Max. Transmission Power level on Channel K |
|---|---|---|---|---|---|---|---|
| 1 | 1 | 1 | 1 | 1 | | 1 | 1 |

Octets :

Fig. 7

(a) Vacant TV channels (b) Available TV channels for fixed device (c) Available TV channels for personal/potable device

Fig. 8

| Device Type | Channel Number N | Max. Transmission Power level on Channel N |
|---|---|---|
| Fixed device | 23 | 100mW |

| Device Type | Channel Number N | Max. Transmission Power level on Channel N | Channel Number M | Max. Transmission Power level on Channel M | Channel Number K | Max. Transmission Power level on Channel K |
|---|---|---|---|---|---|---|
| Personal/personal/portable device | 22 | 40mW | 23 | 100mW | 24 | 40mW |

| | Device Type | Channel Number M | Max. Transmission Power level on Channel M |
|---|---|---|---|
| | Fixed and Personal/personal/portable device | 23 | 100mW |

| | Device Type | Channel Number N | Max. Transmission Power level on Channel N | Channel Number K | Max. Transmission Power level on Channel K |
|---|---|---|---|---|---|
| | Personal/personal/portable device | 22 | 40mW | 24 | 40mW |

Fig. 11

| Spectrum mask class | Reduction in Power Spectral Density, dBr | | | | |
|---|---|---|---|---|---|
| | ±4.5MHz Offset | ±5.0MHz Offset | ±5.5MHz Offset | ±10MHz Offset | ±15MHz Offset |
| Class A | 0 | -10 | -20 | -28 | -40 |
| Class B | 0 | -35 | -45 | -55 | -65 |

Class A

Class B

Fig. 12

(a) Vacant TV channels (b) Available TV channels for personal/portable device
using Spectrum mask class A (b) Available TV channels for personal/portable device
using Spectrum mask class B

|  | Device Type | Starting Channel Number(S) | Number of Channels (L) | Channel Bitmap |
|---|---|---|---|---|
| Octets : | 1 | 1 | 1 | Variable |

METHOD AND APPARATUS OF TRANSMITTING A WHITE SPACE MAP INFORMATION IN A WIRELESS LOCAL AREA NETWORK SYSTEM

TECHNICAL FIELD

The present invention relates to a wireless local area network (WLAN), and more particularly, to a method of transmitting a White Space Map information in a wireless local area network system (WLAN).

BACKGROUND ART

The standard for a Wireless Local Area Network (WLAN) technology is established by IEEE 802.11 standard association. IEEE 802.11a/b among IEEE 802.11 standards provides 11 Mbps (IEEE 802.11b) or 54 Mbps (IEEE 802.11a) transmission efficiency using unlicensed band on 2.4. GHz or 5 GHz frequency band. IEEE 802.11g, adapting OFDM (Orthogonal Frequency Divisional Multiplexing) technology, provides 54 Mbps transmission efficiency. And, IEEE 802.11n, adapting MIMO-OFDM technology, provides 300 Mbps transmission efficiency for 4 spatial streams. IEEE 802.11n provides 40 MHz channel bandwidth, and in this case it provides up to 600 Mbps transmission efficiency.

Now, a standard for regulating the WLAN operation in TV White Space is under establishment, as IEEE 802.11af.

TV Whitespace includes channels allocated to broadcast TV, which are permitted to be used by cognitive radio device. TV White Space may include UHF band and VHF band. The spectrum not used by a licensed device (hereinafter, can be called as 'White Space') can be used by an unlicensed device. The frequency band permitted to be used by unlicensed device can be differently defined for each country. Generally, this frequency band comprises 54-698 MHz (US, Korea), and some of this frequency band can't be used for the unlicensed device. Here, 'licensed device' means a device of the user permitted in this frequency band, and can be differently called as 'primary user', or 'incumbent user'. Hereinafter, the term of 'incumbent user' can be collectively used for these terms.

512-608 MHz and 614-698 MHz are permitted to be used by all kinds of unlicensed devices except a few of special cases. However, 54-60 MHz, 76-88 MHz, 174-216 MHz and 470-512 MHz are permitted to be used by fixed devices, which perform transmission at a fixed location.

The unlicensed device, which wishes to use the TV White Space (TVWS), shall acquire information for available channel list at its location. Hereinafter, the unlicensed device operating in the TVWS using MAC (Medium Access Control) and PHY (Physical) operation according to IEEE 802.11 can be called as TVWS terminal.

Unlicensed device should provide a protection mechanism for the incumbent user. That is, the unlicensed device should stop using a specific channel, when an incumbent user, such as wireless microphone, is using that specific channel.

For this purpose, an unlicensed device shall access geo-location database through internet or dedicated network and acquire an available channel list at its location. The geo-location database stores and manages the information of registered licensed devices, location of the registered licensed devices and channel usage information, which is changed dynamically.

Or, an unlicensed device shall perform spectrum sensing. Spectrum sensing mechanism comprises Energy Detection scheme, Feature Detection scheme, etc. By using this mechanism, unlicensed device determines that the channel is used by an incumbent user, when the strength of the primary signal is greater than a predetermined level, or when DTV (Digital Television) Preamble is detected. And, the unlicensed device (station or Access Point) shall lower its transmission power, when it is detected that the neighboring channel, next to the channel used by the unlicensed device, is used by the incumbent user.

DISCLOSURE OF INVENTION

Technical Problem

The object of the present invention is providing efficient format of the information for the available channel in TVWS.

The object of the present invention is not limited the above stated objects, but includes various objects recited or apparent among the detailed description of the present invention.

Solution to Problem

One aspect of the present invention provides a method of transmitting a white space map information from a first station to a second station in a regulatory domain where a licensed device and an unlicensed device are permitted to operate together in a wireless local area network (WLAN) comprising transmitting, from the first station, one of a beacon frame, a probe response frame and a white space map announcement frame comprising a white space map (WSM) element comprising information for first available channels, which are available for the unlicensed device, to the second station, wherein the WSM element comprises a device type field indicating which device type the list of the first available channels is for.

Preferably, the WSM element further comprises a channel number field and a maximum transmission power level field, wherein the channel number field indicates the first available channels and the maximum transmission power level field indicates maximum allowed transmission power of the first available channels.

Preferably, the step of transmitting comprises transmitting a common WSM element comprising information for second available channels, which are available for devices of all device types, and transmitting an additional WSM element for a specific device type comprising information for third available channels, which are available for devices of the specific device type expect the second available channels.

Preferably, the device type includes a fixed device and a portable device.

Preferably, the device type is defined according to spectrum mask classes.

Preferably, the WSM element further comprises channel bitmap indicating whether each channel of a plurality of channels is available for the unlicensed device or not.

Preferably, the WSM element further comprises a starting channel number field and a number of channels field, wherein the starting channel number field indicates a channel which the channel bitmap starts from and the number of channels field indicates the number of channels the channel bitmap presents.

Another aspect of the present invention provides an apparatus for transmitting a white space map information from a first station to a second station in a regulatory domain where a licensed device and an unlicensed device are permitted to operate together in a wireless local area network (WLAN) comprises a transceiver configured to transmit one of a beacon frame, a probe response frame and a white space map announcement frame comprising a white space map (WSM)

element comprising information for first available channels, which are available for the unlicensed device, to the second station; and a processor configured to generate one of the beacon frame, the probe response frame and the white space map announcement frame, wherein the WSM element comprises a device type field indicating which device type the list of the fist available channels is for.

Advantageous Effects of Invention

According to embodiments of the present invention, the WSM element can be configured for each device type.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart.

First of all, Wireless Local Area Network (WLAN) system in which embodiments of the present invention can be applied is explained.

Figure 1:
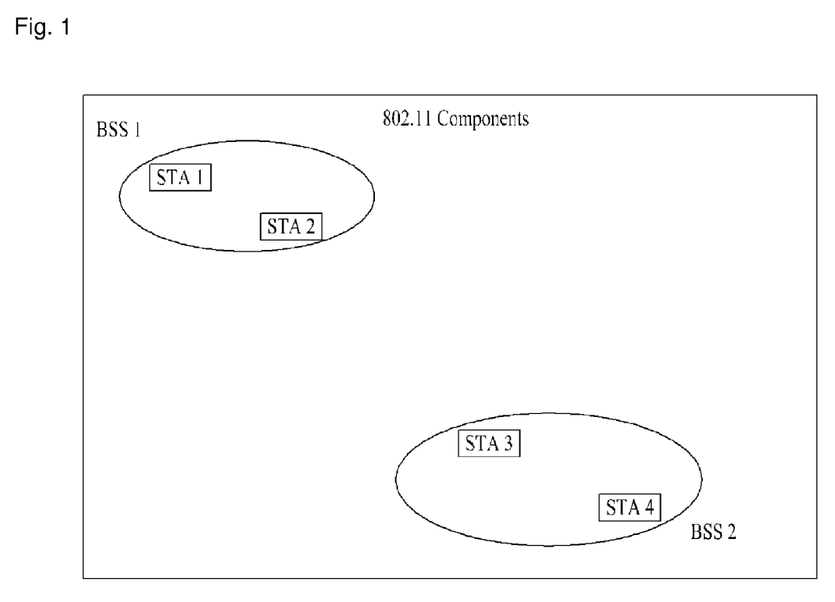
FIG. 1 shows an exemplary architecture of IEEE 802.11 system.

FIG. 1 shows an exemplary architecture of IEEE 802.11 system.

The IEEE 802.11 architecture consists of several components that interact to provide a WLAN that supports STA (station) mobility transparently to upper layers. The basic service set (BSS) is the basic building block of an IEEE 802.11 LAN. FIG. 1 shows two BSSs, each of which has two STAs that are members of the BSS. It is useful to think of the ovals used to depict a BSS as the coverage area within which the member STAs of the BSS may remain in communication. (The concept of area, while not precise, is often good enough.) This area is called the Basic Service Area (BSA). If a STA moves out of its BSA, it can no longer directly communicate with other STAs present in the BSA.

The independent BSS (IBSS) is the most basic type of IEEE 802.11 LAN. A minimum IEEE 802.11 LAN may consist of only two STAs. Since the BSSs shown in FIG. 1 are simple and lack other components (contrast this with FIG. 2), the two can be taken to be representative of two IBSSs. This mode of operation is possible when IEEE 802.11 STAs are able to communicate directly. Because this type of IEEE 802.11 LAN is often formed without pre-planning, for only as long as the LAN is needed, this type of operation is often referred to as an ad hoc network.

A STA's membership in a BSS is dynamic (STAs turn on, turn off, come within range, and go out of range). To become a member of a BSS, a STA joins the BSS using the synchronization procedure. To access all the services of an infrastructure BSS, a STA shall become "associated." These associations are dynamic and involve the use of the distribution system service (DSS).

Figure 2:
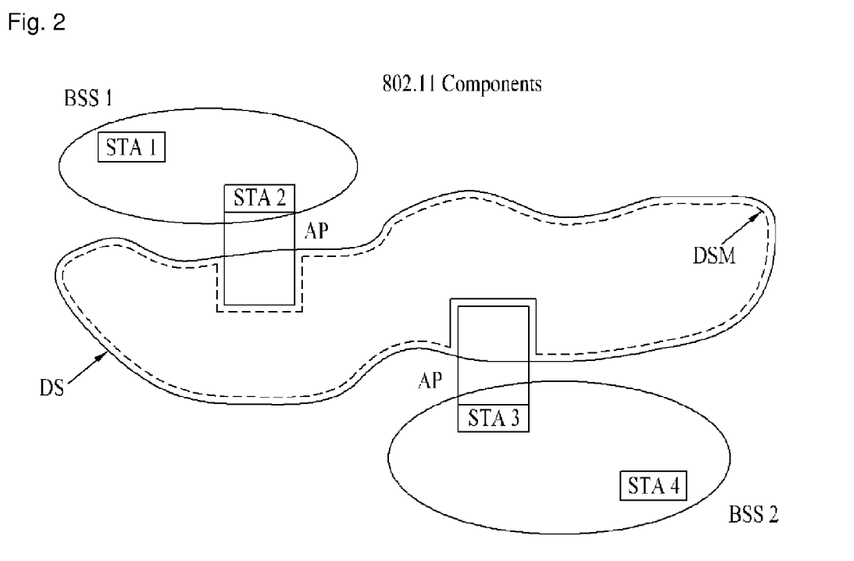
FIG. 2 is another exemplary architecture of IEEE 802.11 system in which the DS, DSM and AP components are added to the IEEE 802.11 architecture picture.

FIG. 2 is another exemplary architecture of IEEE 802.11 system in which the DS, DSM and AP components are added to the IEEE 802.11 architecture picture.

PHY limitations determine the direct station-to-station distance that may be supported. For some networks, this distance is sufficient; for other networks, increased coverage is required. Instead of existing independently, a BSS may also form a component of an extended form of network that is built with multiple BSSs. The architectural component used to interconnect BSSs is the DS (Distribution System).

IEEE Std 802.11 logically separates the WM (wireless Medium) from the distribution system medium (DSM). Each logical medium is used for different purposes, by a different component of the architecture. The IEEE 802.11 definitions neither preclude, nor demand, that the multiple media be either the same or different.

Recognizing that the multiple media are logically different is the key to understanding the flexibility of the architecture.

The IEEE 802.11 LAN architecture is specified independently of the physical characteristics of any specific implementation.

The DS enables mobile device support by providing the logical services necessary to handle address to destination mapping and seamless integration of multiple BSSs.

An access point (AP) is any entity that has STA functionality and enables access to the DS, via the WM for associated STAs.

Data move between a BSS and the DS via an AP. Note that all APs are also STAs; thus they are addressable entities. The addresses used by an AP for communication on the WM and on the DSM are not necessarily the same.

Data sent to the AP's STA address by one of the STAs associated with it are always received at the uncontrolled port for processing by the IEEE 802.1X port access entity. In addition, if the controlled port is authorized, these frames conceptually transit the DS.

Hereinafter, Extended Service Set (ESS) for a large coverage network is explained.

Figure 3:
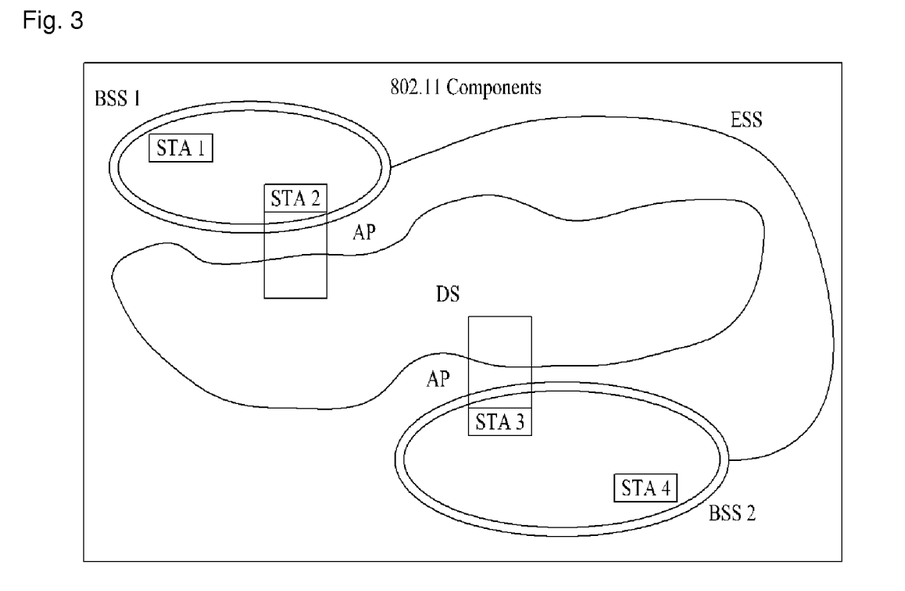
FIG. 3 shows another exemplary architecture of IEEE 802.11 system for explaining the concept of ESS.

FIG. 3 shows another exemplary architecture of IEEE 802.11 system for explaining the concept of ESS.

The DS and BSSs allow IEEE Std 802.11 to create a wireless network of arbitrary size and complexity. IEEE Std 802.11 refers to this type of network as the ESS network. An ESS is the union of the BSSs connected by a DS. The ESS does not include the DS. The key concept is that the ESS network appears the same to an LLC (logical link control) layer as an IBSS network. STAs within an ESS may communicate and mobile STAs may move from one BSS to another (within the same ESS) transparently to LLC.

Nothing is assumed by IEEE Std 802.11 about the relative physical locations of the BSSs in FIG. 3. All of the following are possible:

The BSSs may partially overlap. This is commonly used to arrange contiguous coverage within a physical volume.

The BSSs could be physically disjoint. Logically there is no limit to the distance between BSSs.

The BSSs may be physically collocated. This may be done to provide redundancy.

One (or more) IBSS or ESS networks may be physically present in the same space as one (or more) ESS networks. This may arise for a number of reasons. Some examples are when an ad hoc network is operating in a location that also has an ESS network, when physically overlapping IEEE 802.11 networks have been set up by different organizations, and when two or more different access and security policies are needed in the same location.

Figure 4:
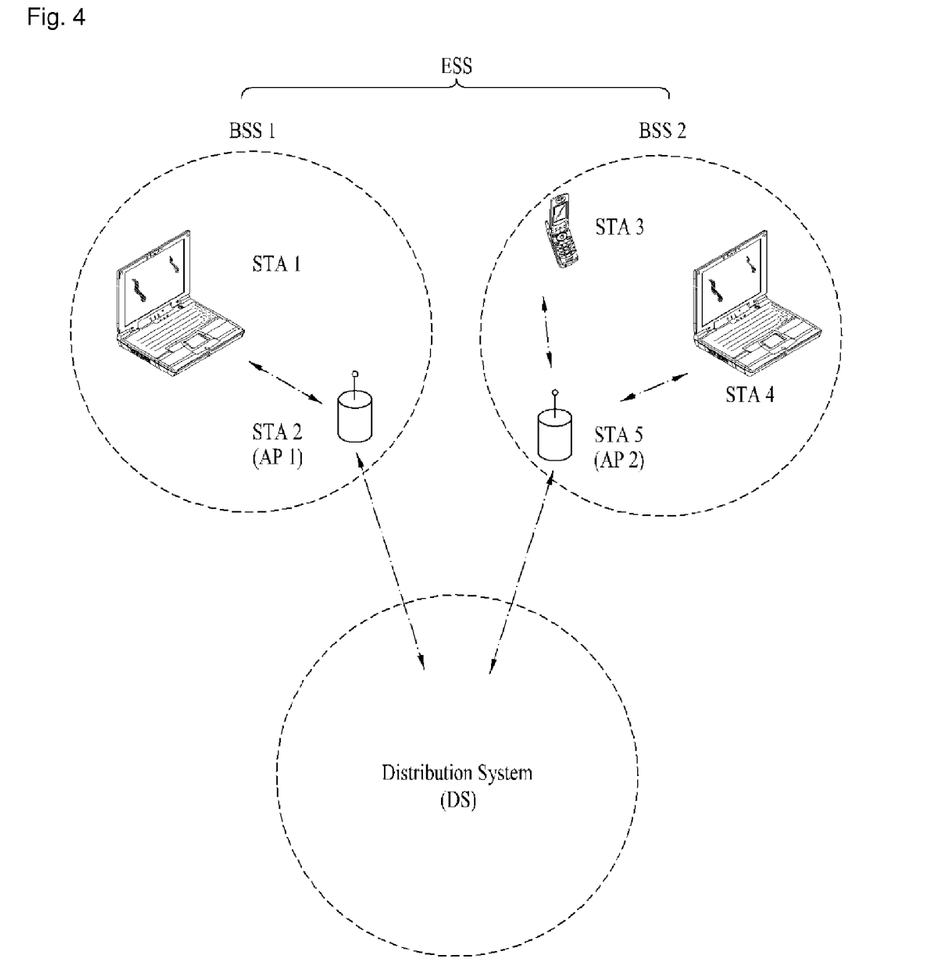
FIG. 4 shows exemplary system architecture for better understanding the WLAN system.

FIG. 4 shows exemplary system architecture for better understanding the WLAN system.

As can be understood, FIG. 4 is an example of infrastructure BSS including DS. And BSS 1 and BSS 2 consist of ESS. In WLAN system, a STA is a device operating according to MAC/PHY regulation of IEEE 802.11, and includes an AP STA and non-AP STA, such a laptop computer, mobile phone, etc. Usually, the device which a user directly handles is non-AP STA. Hereinafter, non-AP STA can be differently called as (terminal), WTRU (Wireless Transmit/Receive Unit), User Equipment (UE), Mobile Station (MS), Mobile Terminal, Mobile Subscriber Unit, etc. And, non-AP STA, which can operate within TVWS spectrum, can be called as 'Non-AP WS STA' or 'WS STA'. AP can corresponds to Base Station (BS), Node-B, BTS (Base Transceiver System), or Femto BS in another field of wireless communication. AP, which can operate within TVWS, can be called as WS AP.

Hereinafter, the format of White Space Map (WSM) and a method of transmitting WSM information according to an embodiment of the present are disclosed.

First, necessity of WSM will be explained.

In order to operate in TVWS as an unlicensed device, a STA should find the network to be connected. This type of process may be called as 'scanning'. In IEEE 802.11, there are two types of scanning process. One is a passive scanning process, and the other is an active scanning process.

In the passive scanning scheme, the scanning STA receives a beacon frame transmitted periodically from AP while moving each channel on a channel list, and acquires information about a AP operating in the corresponding channel. The channel list specifies a list of channels that are examined when scanning for a BSS.

In the active scanning scheme, the scanning STA broadcasts a probe request frame while moving each channel on the channel list, and waits for a pertinent response. A AP, which received the probe request frame, transmits a probe response frame to the scanning STA. The probe response frame includes operation parameters (e.g., AP's capability information element, HT operation element, EDCA parameter set element, etc) for a BSS.

Delay and power consumption in active scan are lower than those in passive scan.

If we assume that the channel bandwidth used for by the IEEE 802.11 TVWS protocol in TVWS is the same as the channel bandwidth used by Digital TV (DTV), the channel bandwidth of each channel shall be 6 MHz. For IEEE 802.11 operation in 2.4 GHz and 5 GHz, the channel bandwidth is 20 MHz. This means that there are a lot more channels to be scanned by a STA in TVWS than the channels in 2.4 GHz and/or 5 GHz. This can significantly increase the scanning time and power consumption for a STA to find the network to be connected.

Also, in order to operate in TVWS as an unlicensed device, a STA should have a mechanism for protecting the incumbent user. The most casual approach to find the available channel in TVWS is performing, at the STA, 'sensing' to find whether there is an incumbent user operates on a specific channel. (It should be noted that the term 'sensing' is for finding whether there is a primary signal on a specific channel, that is, for finding the available channel, while the term 'scanning' is for finding the network to be connected.) Another approach is accessing the external regulatory domain database (DB) to find the available channel list in TVWS. For the TVWS, the external regulatory DB can be TV band database. The DB can include information for scheduling of licensed users at a specific geographic location. Therefore, the enabling STA can access via internet to the regulatory domain database and acquire the available channel list at its own geographic location, and deliver this available channel lists to other STAs, rather than each of the STAs perform sensing every channels to find whether they are available or not. In this document, information for the available channel list from the regulatory domain database may be called as 'White Space Map (WSM)'. Further, if a STA acquires the available channel list in TVWS to operate, the STA need not perform scanning on a channel identified as not available by WSM. Therefore, acquiring the WSM from DB and delivering this WSM can efficiently reduce the scanning time and power consumption.

Next, the format of WSM and a method of transmitting WSM information according to an embodiment of the present are explained referring to draws.

The enabling STA or the dependent AP, which enables a dependent AP, transmits one of a beacon frame, a probe response frame and a white space map announcement frame comprising a white space map (WSM) element to a dependent STA.

Figure 5:
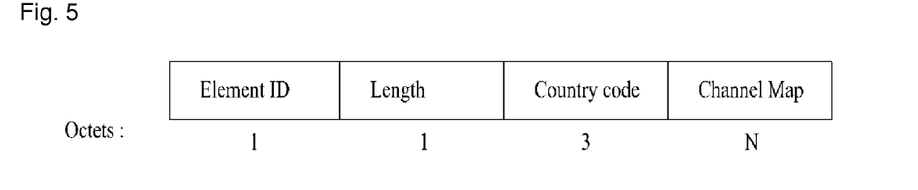
FIG. 5 shows the format of a WSM element according to an embodiment of the present.

FIG. 5 shows the format of a WSM element according to an embodiment of the present.

As shown in FIG. 5, a WSM element includes Element ID field, a Length field, a Country code field and a Channel Map field.

The Element ID field may indicate that this element is White Space Map element. The Length field has a variable value in a unit of octet corresponding to the length of WSM. Since the numbers of available channels and corresponding maximum power level values are variable, the length field may indicate the length of WSM element.

The country code field indicates a location at which the WSM can be used. TV band, bandwidth of TV channel and regulatory domain vary among countries. The country code can be 3 octets country string. First 2 octets indicate country code defined in ISO/IEC 3166-1, and last 1 octet indicates environment. The country code field can indicates detailed location more than country. That is, the country code field can includes a region code in a country.

The Channel Map field indicates the list of available channels.

Available channels identified by the Channel Map field do not have to have a TV channel granularity. However, they can have the smallest channel granularity provided by database. If the smallest channel granularity of available channels provided by database in TVWS is TV channel granularity, available channels of the Channel Map field have TV channel granularity. TV channel bandwidth is 6 MHz in Korea and USA, and 8 MHZ in some countries.

Figure 6:
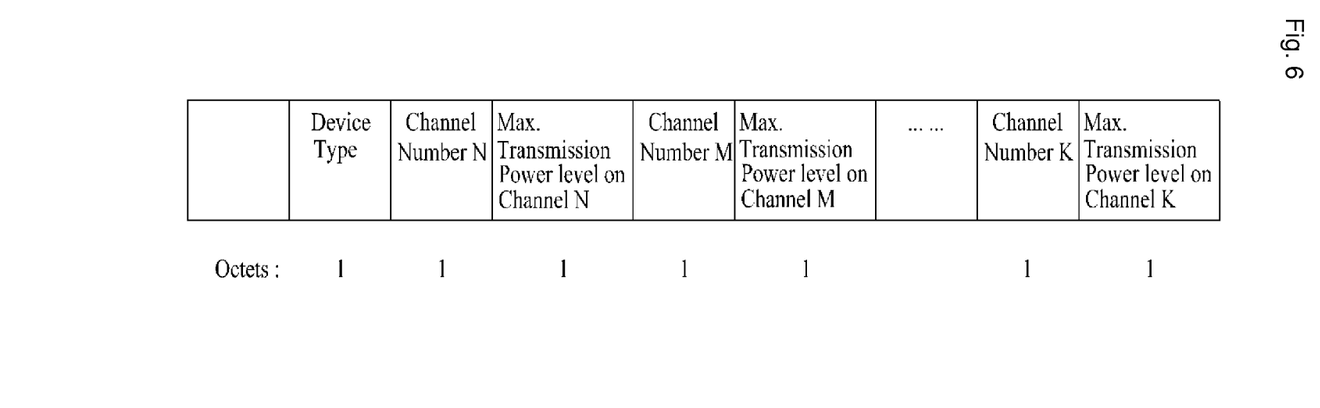
FIG. 6 shows an exemplary format of the Channel Map field according to an embodiment of the present invention

FIG. 6 shows an exemplary format of the Channel Map field according to an embodiment of the present invention.

As shown in FIG. 6, the Channel Map field can includes a Device Type field, a Channel Number field and a Maximum Transmission Power Level field.

The Channel Number field indicates the list of available channels. The Maximum Transmission Power Level field indicates maximum allowed transmission power of the available channels.

When the unlicensed device operates on a specific channel which is available in TVWS and the neighboring channel next to the specific channel is used by an incumbent user, the unlicensed device should lower its transmission power to protect the incumbent user. Therefore, WSM element comprises available channel list and maximum allowed transmission power of the available channels.

The Channel Number field and Maximum Transmission Power Level field pairs can be repeated.

The Device Type field indicates which type of device the list of available channels in WSM element is for. For example, the Device Type field indicates whether the list of available channels in WSM element is for a fixed device or a portable device.

Available channels and maximum allowed transmission power of the available channels can vary among device types. A fixed device cannot use a channel adjacent to a TV channel used by an incumbent user, while a portable device can use a channel adjacent to a TV channel used by an incumbent user on condition that it reduces maximum allowed transmission power from 100 mW to 40 mW. Therefore, the WSM element shall include the Device Type field indicating which type of device the available channels in WSM element are for.

The Device Type field indicates not the device type of a STA transmitting the WSM element but the device type of a STA receiving the WSM element and using it.

The fixed device cannot use WSM including the Device Type field set to a value of portable device, since available channels in the WSM including the Device Type field set to a value of portable device may not be available for s fixed device.

Figure 7:
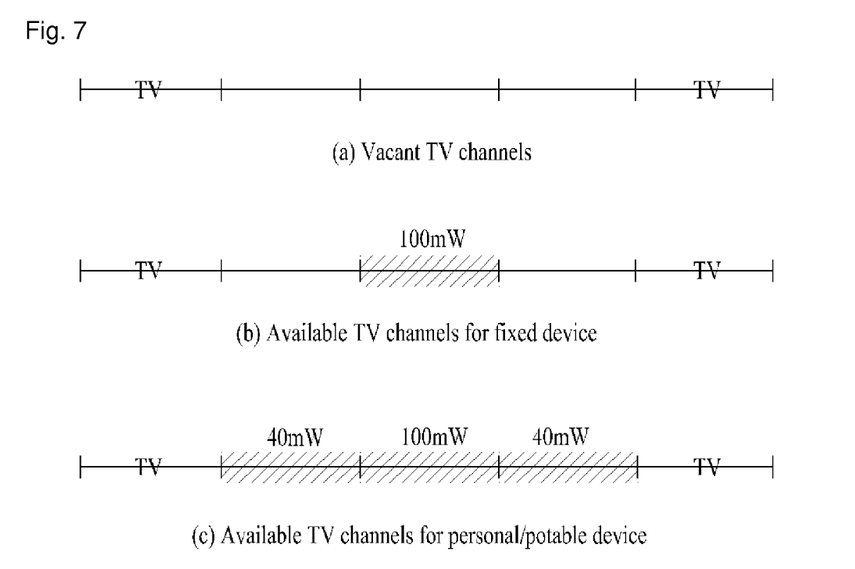
FIG. 7 shows available channels for each device type.

FIG. 7 shows available channels for each device type.

It is assumed that FIG. 7 illustrates 5 TV channels from channel number 21 to channel number 25, and channel number 21 and channel number 25 are used by an incumbent user. Then, a fixed device cannot operates on not only channel number 21 and channel number 25 but also channel number 22 and channel number 24, which are channels adjacent to number 21 and channel number 25. That is, a fixed device can operates on channel number 23 with 100 mW maximum allowed transmission power. And, a portable device can operates on channel number 22 and channel number 24 with 40 mW maximum allowed transmission power, and on channel number 23 with 100 mW maximum allowed transmission power.

Because available channels and maximum allowed transmission power of the available channels can vary among device types, a STA receiving a WSM must be able to know which WSM is for itself. A STA can know whether a received WSM is for itself or not with the Device Type field.

Each WSM for each device type can be configured independently. Or, common WSM for all device type can be configured and an additional WSM for a specific device type can be configured.

Figure 8:
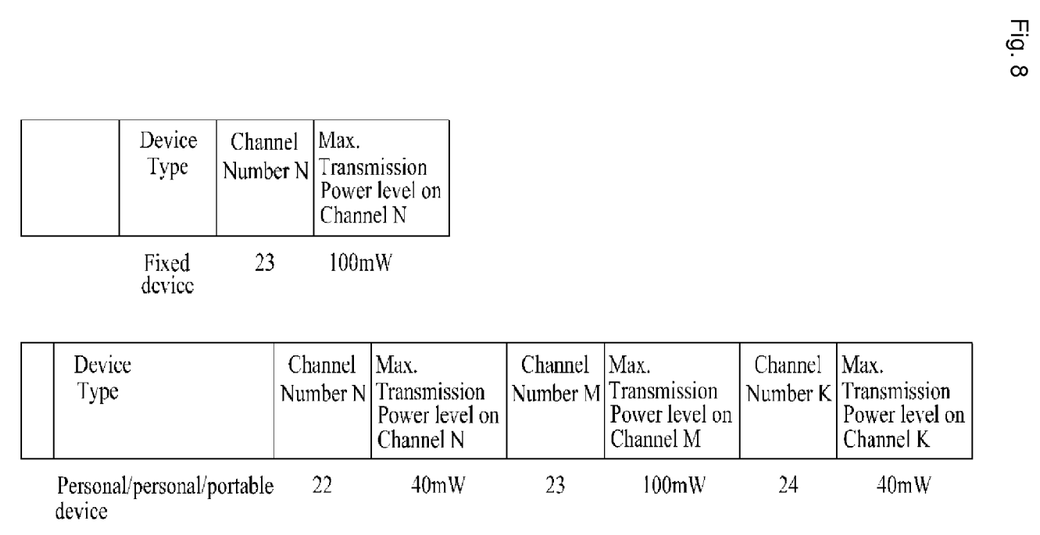
FIG. 8 illustrates Channel Map fields in case that each WSM for each device type is configured independently.

FIG. 8 illustrates Channel Map fields in case that each WSM for each device type is configured independently.

As shown in FIG. 8, Channel Map field for a fixed device includes a Channel Number field set to 23 and a Maximum Transmission Power Level field set to 100 mW. And, Channel Map field for a portable device includes three Channel Number fields set to 22, 23 and 24 respectively, and three Maximum Transmission Power Level fields set to 40 mW, 100 mW and 40 mW respectively.

Figure 9:
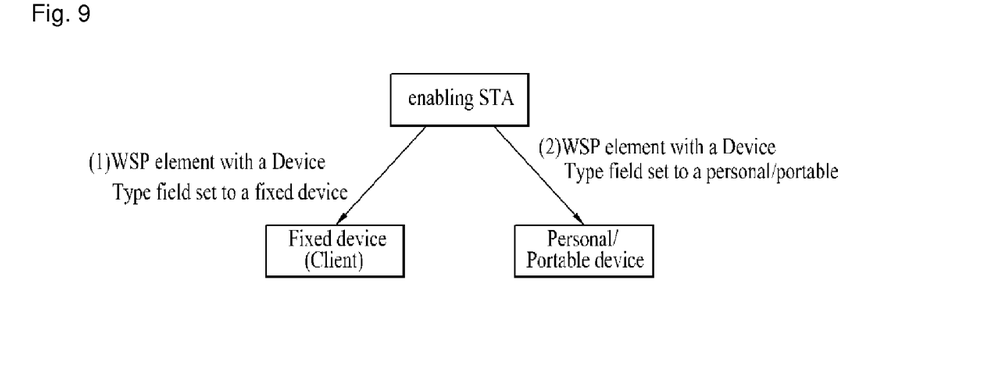
FIG. 9 shows WSM transmission procedure of an enabling STA.

FIG. 9 shows WSM transmission procedure of an enabling STA. As shown in FIG. 9, an enabling STA transmits each WSM for each device type independently. That is, after an enabling STA transmits WSM for a fixed device, it transmits WSM for a portable device. Or, after transmitting WSM for a portable device, an enabling STA can transmit WSM for a fixed device.

Figure 10:
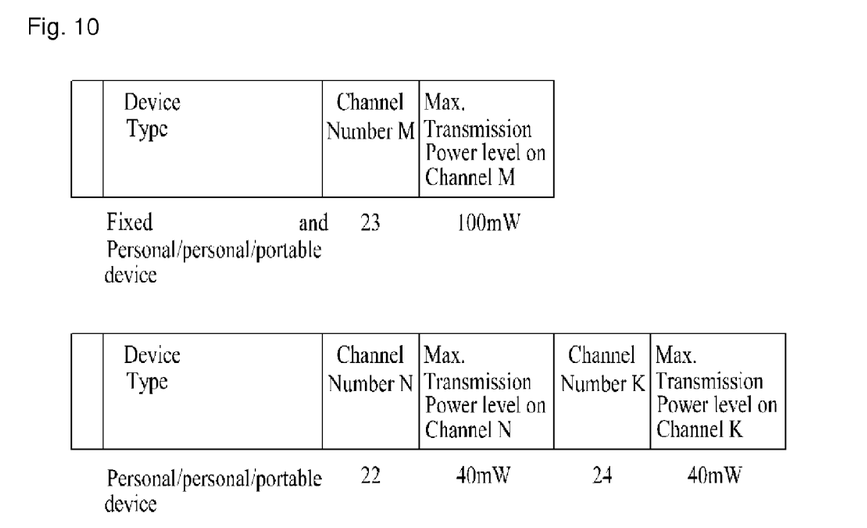
FIG. 10 illustrates Channel Map fields in case that common WSM for all device type is configured and an additional WSM for a specific device type is configured.

FIG. 10 illustrates Channel Map fields in case that common WSM for all device type is configured and an additional WSM for a specific device type is configured.

As shown in FIG. 10, Channel Map field of a common WSM includes a Channel Number field set to 23 and a Maximum Transmission Power Level field set to 100 mW. And, Channel Map field of additional WSM for a portable device includes two Channel Number fields set to 22 and 24 respectively, and two Maximum Transmission Power Level fields set to 40 mW and 40 mW respectively.

In case of FIG. 10, an enabling STA transmits a common WSM element comprising a list of second available channels, which are available for devices of all device types, and then it transmits an additional WSM for a specific device type comprising a list of third available channels, which are available for devices of the specific device type expect the second available channels.

Device type can be defined according to spectrum mask class. A spectrum mask is a mathematically-defined set of lines applied to the levels of radio (or optical) transmissions. The spectrum mask is generally intended to reduce adjacent-channel interference by limiting excessive radiation at frequencies beyond the necessary bandwidth. Attenuation of these spurious emissions is usually done with a band-pass filter, tuned to allow through the correct center frequency of the carrier wave, as well as all necessary sidebands.

A device using a specific spectrum mask class must satisfy a reduction value of power spectral density according to offset frequencies of the specific spectrum mask class. So, available channels and maximum allowed transmission power vary according to a spectrum mask class of a STA.

Figure 11:
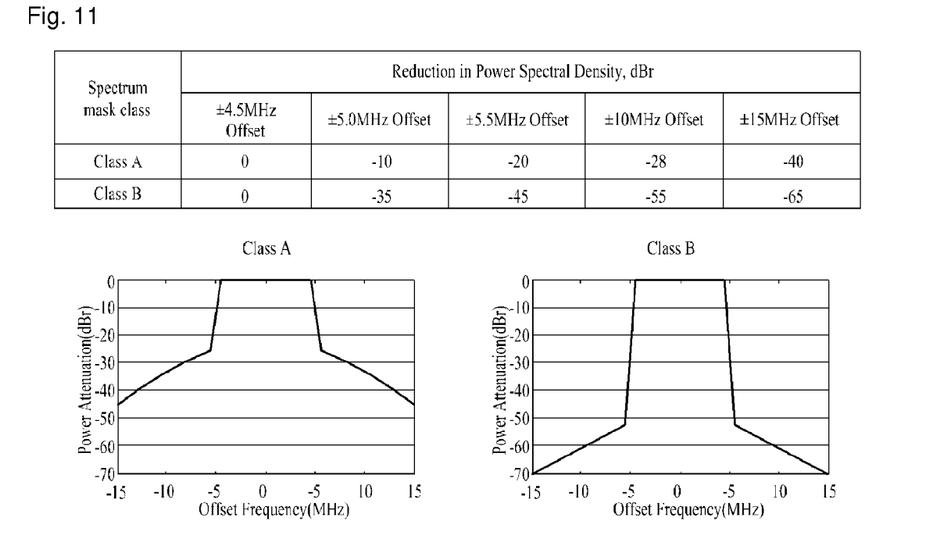
FIG. 11 shows power attenuation of two spectrum mask classes.

For example, two spectrum mask classes can be defined by a regulation. Table 1 shows reduction of power spectral density of two spectrum mask classes. FIG. 11 shows power attenuation of two spectrum mask classes.

TABLE 1

| Spectrum Mask class | Reduction in Power Spectral Density, dBr | | | | |
|---|---|---|---|---|---|
| | ±4.5 MHz Offset | ±5.0 Mhz Offset | ±5.5 MHz Offset | ±10 MHz Offset | ±15 MHz Offset |
| Class A | 0 | −10 | −20 | −28 | −40 |
| Class B | 0 | −35 | −45 | −55 | −65 |

As show in table 1 and FIG. 11, Spectrum mask class B has stricter requirement than spectrum mask class A.

A STA using spectrum mask having a sharp edge can use higher power in a channel adjacent to a channel used by an incumbent user, as satisfying interference requirement for the incumbent user.

Figure 12:
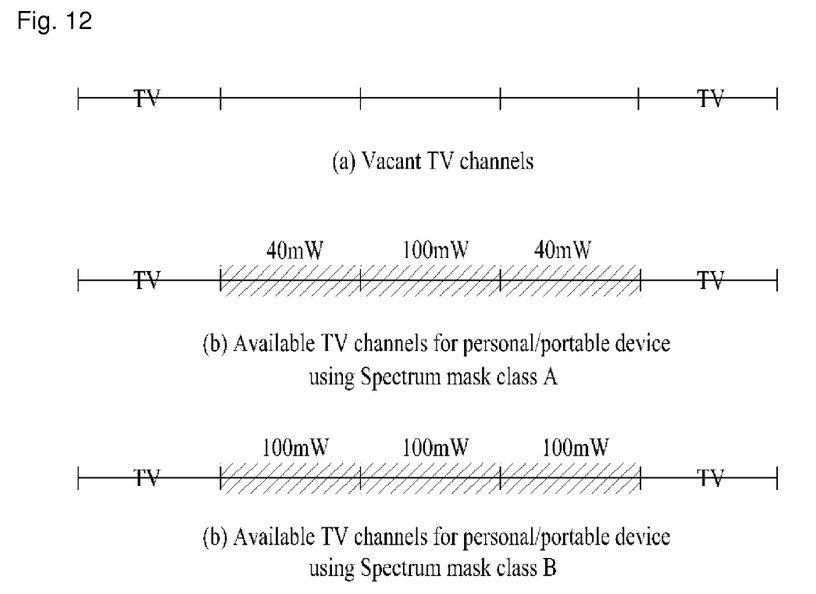
FIG. 12 shows available TV channels according to used spectrum mask classes.

FIG. 12 shows available TV channels according to used spectrum mask classes.

As shown in FIG. 12, maximum allowed transmission power on a channel adjacent to a channel used by an incumbent user of a portable device using spectrum mask class A is different from that of a portable device using spectrum mask class B.

Therefore, WSM can vary among spectrum mask classes. Table 2 shows an example of device types.

TABLE 2

| Device Type | Description |
|---|---|
| 0 | Reserved |
| 1 | Fixed and Portable Device |
| 2 | Fixed Device |
| 3 | Portable Device |
| 4 | Portable Device (Spectrum Mask Class A) |
| 5 | Portable Device (Spectrum Mask Class B) |
| 6-255 | Reserved |

The WSM element whose Device Type field set to 1 is for a fixed device and a portable device. The WSM element whose Device Type field set to 2 is for only a fixed device. The WSM element whose Device Type field set to 3 is for only a portable device. The WSM element whose Device Type field set to 4 is for only a portable device having spectrum mask class A. The WSM element whose Device Type field set to 5 is for only a portable device having spectrum mask class B.

Figure 13:
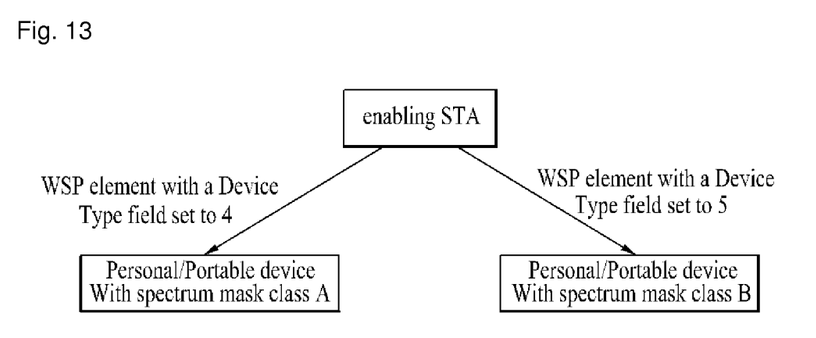
FIG. 13 shows an exemplary WSM transmission procedure of an enabling STA.

FIG. 13 shows an exemplary WSM transmission procedure of an enabling STA.

Shown in FIG. 13, an enabling STA transmits WSM element whose Device Type field set to 4, to a portable device having spectrum mask class A, and then it transmits WSM element whose Device Type field set to 5, to a portable device having spectrum mask class B. Transmission order can be changed. That is, an enabling STA can transmit WSM element whose Device Type field set to 5, and then it can transmit WSM element whose Device Type field set to 4.

Figure 14:
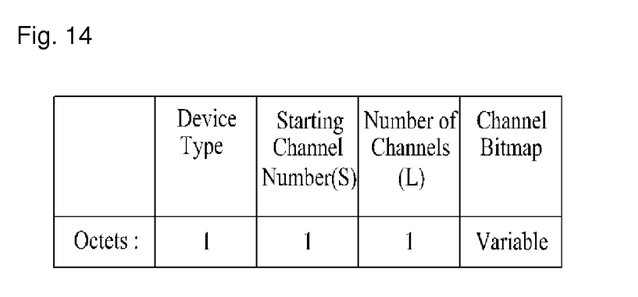
FIG. 14 shows another exemplary format of the Channel Map field according to an embodiment of the present.

FIG. 14 shows another exemplary format of the Channel Map field according to an embodiment of the present.

As shown in FIG. 14, Channel Map field can include a Device Type field, a Starting Channel Number field, a Number of Channels field and a Channel Bitmap.

The Device Type field indicates which device type the WSM element is for. For example, the Device Type field indicates whether the WSM element is for a fixed device or a personal/portable device.

The Starting Channel Number field indicates a TV channel the Channel Bitmap starts from.

The Number of Channels field indicates the number of channels the Channel Bitmap presents.

Channel Bitmap indicates whether each channel of a plurality of channels is available for an unlicensed device or not. The plurality of channels starts from a value of the Starting Channel Number field and the number of the plurality of channels is a value of the Number of Channels field. The $(n+1)^{th}$ bit of the Channel Bitmap indicates whether the $(Fs+n)^{th}$ channel is available for an unlicensed device or not, wherein Fs is a value of the Starting Channel Number field.

A bit corresponding to an available channel can be set to 1 and a bit corresponding to an unavailable channel can be set to 0. Or, a bit corresponding to an available channel can be set to 0 and a bit corresponding to an unavailable channel can be set to 1.

Figure 15:
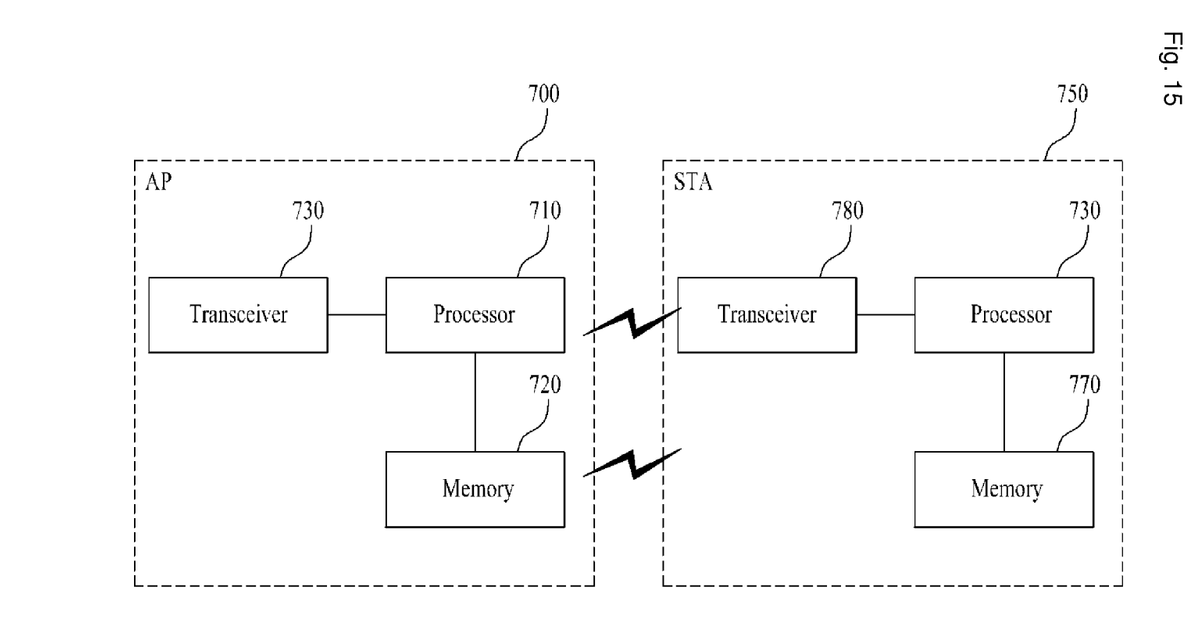
FIG. 15 is a schematic block diagram of wireless apparatuses implementing an exemplary embodiment of the present invention.

FIG. 15 is a schematic block diagram of wireless apparatuses implementing an exemplary embodiment of the present invention.

An AP 700 can include a processor 710, a memory 720, a transceiver 730, and a STA 750 may include a processor 760, a memory 770, and a transceiver 780. The transceivers 730 and 780 transmit/receive a radio signal and implement an IEEE 802 physical layer. The processors 710 and 760 are connected with the transceivers 730 and 760 to implement an IEEE 802 physical layer and/or MAC layer. The processors 710 and 760 may implement the above-described channel scanning method.

The processors 710 and 760 and/or the transceivers 730 and 780 may include an application-specific integrated circuit (ASIC), a different chip set, a logical circuit, and/or a data processing unit. The memories 720 and 770 may include a read-only memory (ROM), a random access memory (RAM), a flash memory, a memory card, a storage medium, and/or any other storage units. When an exemplary embodiment is implemented by software, the above-described scheme may be implemented as a module (process, function, etc.) performing the above-described functions. The module may be stored in the memories 720 and 770 and executed by the processors 710 and 760. The memories 720 and 770 may be disposed within or outside the processors 710 and 760 and connected with the processors 710 and 760 via well-known means.

Among these elements of apparatuses for AP/STA, the structure of processor 710 or 760 will be more specifically explained.

Figure 16:
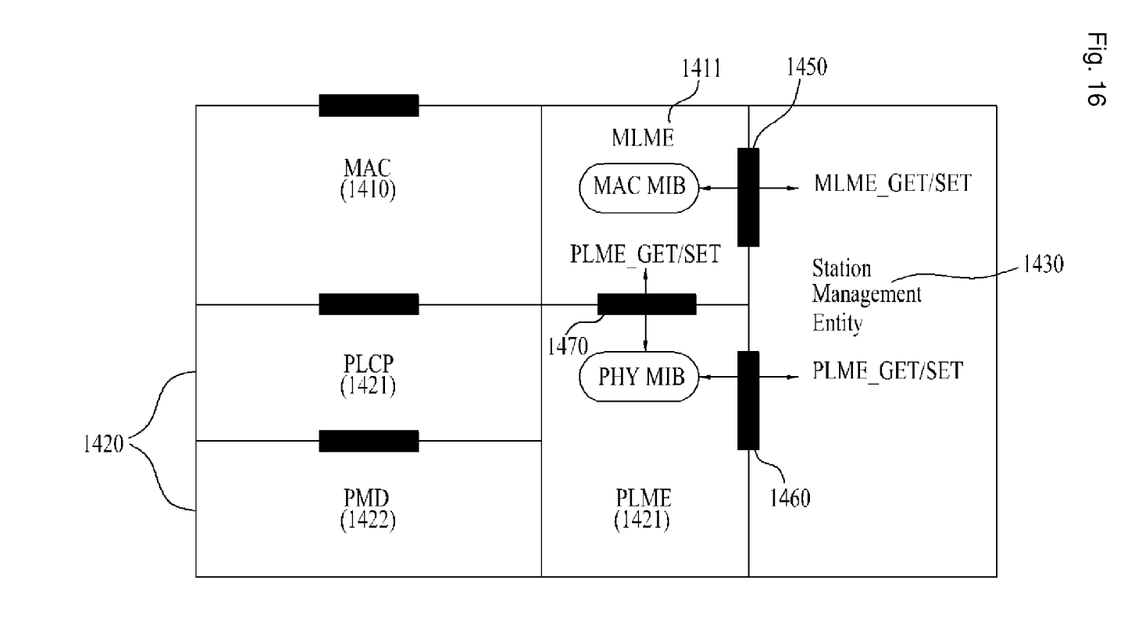
FIG. 16 shows an exemplary structure of processor of STA apparatus according to one embodiment of the present invention.

FIG. 16 shows an exemplary structure of processor of STA apparatus according to one embodiment of the present invention.

Processor 710 or 760 of STA may have multiple layer structures, and FIG. 16 especially focuses on MAC sublayer (1410) on data link layer (DLL) and Physical layer (1420) among these layers. As shown in FIG. 16, PHY (1420) may include PLCP entity (physical layer convergence procedure entity; 1421) and PMD entity (physical medium dependent entity; 1422). Both the MAC sublayer (1410) and PHY (1420) conceptually include management entities, called MLME (MAC sublayer Management Entity; 1411) and PLME (physical layer management entity; 1421), respectively. These entities (1411, 1421) provide the layer management service interfaces through which layer management functions can be invoked.

In order to provide correct MAC operation, an SME (Station Management Entity; 1430) is present within each STA. The SME (1430) is a layer independent entity that can be viewed as residing in a separate management plane or as residing "off to the side." The exact functions of the SME (1430) are not specified in this document, but in general this entity (1430) can be viewed as being responsible for such functions as the gathering of layer-dependent status from the various layer management entities (LMEs), and similarly setting the value of layer-specific parameters. SME (1430) would typically perform such functions on behalf of general system management entities and would implement standard management protocols.

The various entities within FIG. 16 interact in various ways. FIG. 16 shows some examples of exchanging GET/SET primitives. XX-GET.request primitive is used for requesting the value of the given MIBattribute (management information base attribute). XX-GET.confirm primitive is used for returning the appropriate MIB attribute value if status="success," otherwise returning an error indication in the Status field. XX-SET.request primitive is used for requesting that the indicated MIB attribute be set to the given value. If this MIB attribute implies a specific action, then this requests that the action be performed. And, XX-SET.confirm primitive is used such that, if status="success," this confirms that the indicated MIB attribute was set to the requested value, otherwise it returns an error condition in status field. If this MIB attribute implies a specific action, then this confirms that the action was performed.

As shown in FIG. 16, MLME (1411) and SME (1430) may exchange various MLME_GET/SET primitives via MLME_SAP (1450). According to one example of the present invention, SME (1430) may transmit MLME_WSM.request primitive to MLME (1411) for requesting MLME (1411) to transmit the White Space Map Announcement Frame to another STA. In other case, MLME (1411) may transmit MLME-WSM.indication primitive to SME (1430) to indicate the reception of the White Space Map Announcement Frame from another STA.

Also, as shown in FIG. 16, various PLCM_GET/SET primitives may be exchanged between PLME (1421) and SME (1430) via PLME_SAP (1460), and between MLME (1411) and PLME (1470) via MLME-PLME_SAP (1470).

WSM element of one example of the present invention can be transmitted by the sequential procedures of MAC (1410) and PHY (1420). Also, WSM element of one example of the present invention can be received by the sequential procedures of PHY (1420) and MAC (1410).

Although the embodiments of the present invention have been disclosed in view of each aspect of the invention, those skilled in the art will appreciate that embodiments of each aspect of the invention can be incorporated. And, there can be advantages not explicitly discussed, since they are obvious from the description for those skilled in the art.

The invention claimed is:

1. A method of transmitting a white space map information from a first station to a second station in a regulatory domain where a licensed device and an unlicensed device are permitted to operate together in a wireless local area network (WLAN), the method comprising:

generating, by the first station, a white space map (WSM) element comprising information for first available channels for the second station; and transmitting, from the first station to the second station, a frame comprising the WSM element, wherein the WSM element comprises a device type field indicating which device type a list of the first available channels is for, and wherein the frame is one of: a beacon frame, a probe response frame, or a white space map announcement frame.

2. The method of claim 1, wherein:

the WSM element further comprises at least one channel number field and at least one maximum transmission power level field;

each of the at least one channel number field indicates each channel included in the first available channels; and each of the at least one the maximum transmission power level field indicates a maximum allowed transmission power of each of the at least one channel number field.

3. The method of claim 1, wherein the transmitting comprises:

transmitting a common WSM element comprising information for second available channels, which are available for devices of all device types; and transmitting an additional WSM element for a specific device type comprising information for third available channels, which are available for devices of the specific device type expect the second available channels.

4. The method of claim 1, wherein the device type includes a fixed device and a portable device.

5. The method of claim 4, wherein the device type is defined according to spectrum mask classes.

6. The method of claim 1, wherein the WSM element further comprises a channel bitmap indicating whether each channel of a plurality of channels is available for the unlicensed device or not.

7. The method of claim 6, wherein:

the WSM element further comprises a starting channel number field and a number of channels field;

the starting channel number field indicates a channel which the channel bitmap starts from; and the number of channels field indicates a number of channels the channel bitmap presents.

8. The method of claim 1, wherein the information for first available channels is acquired by the first station from a geolocation database.

9. The method of claim 1, wherein a value of the device type field determines a length of the information for first available channels.

10. The method of claim 1, wherein a value of the device type field indicates a device type of the second station.

11. An apparatus for transmitting a white space map information from a first station to a second station in a regulatory domain where a licensed device and an unlicensed device are permitted to operate together in a wireless local area network (WLAN), the apparatus comprising:

a processor configured to generate a white space map (WSM) element comprising information for first available channels for the second station; and a transceiver configured to transmit, from the first station to the second station, a frame comprising the WSM element, wherein the WSM element comprises a device type field indicating which device type a list of the first available channels is for, and wherein the frame is one of: a beacon frame, a probe response frame, or a white space map announcement frame.

12. The apparatus of claim 11, wherein:
the WSM element further comprises at least one channel number field and at least one maximum transmission power level field;
each of the at least one channel number field indicates each channel included in the first available channels; and
each of the at least one maximum transmission power level field indicates a maximum allowed transmission power of each of the at least one channel number field.

13. The apparatus of claim 11, wherein the transceiver is further configured to transmit:
a common WSM element comprising information for second available channels, which are available for devices of all device types; and
an additional WSM element for a specific device type comprising information for third available channels, which are available for devices of the specific device type expect the second available channels.

14. The apparatus of claim 11, wherein the device type includes a fixed device and a portable device.

15. The apparatus of claim 14, wherein the device type is defined according to spectrum mask classes.

16. The apparatus of claim 11, wherein the WSM element further comprises a channel bitmap indicating whether each channel of a plurality of channels is available for the unlicensed device or not.

17. The apparatus of claim 16, wherein:
the WSM element further comprises a starting channel number field and a number of channels field;
the starting channel number field indicates a channel which the channel bitmap starts from; and
the number of channels field indicates a number of channels the channel bitmap presents.

18. The apparatus of claim 11, wherein the information for first available channels is acquired by the first station from a geolocation database.

19. The apparatus of claim 11, wherein a value of the device type field determines a length of the information for first available channels.

20. The apparatus of claim 11, wherein a value of the device type field indicates a device type of the second station.

* * * * *